C. W. COLONY.

Assignor, by direct and mesne assignments, to the STEAM GAUGE AND LANTERN COMPANY and the R. E. DIETZ COMPANY.

LANTERN.

No. 10,911. Reissued Mar. 20, 1888.

Geo. J. Buchhit Jr.
Chas. J. Buchhit } Witnesses.

Charles W. Colony Inventor.
By Wilhelm Bonnet
Attorneys.

N. PETERS, Photo-Lithographer, Washington, D. C.

UNITED STATES PATENT OFFICE.

CHARLES W. COLONY, OF SANDY CREEK, ASSIGNOR, BY DIRECT AND MESNE ASSIGNMENTS, TO THE STEAM GAUGE AND LANTERN COMPANY, OF ROCHESTER, AND THE R. E. DIETZ COMPANY, OF NEW YORK, N. Y.

LANTERN.

SPECIFICATION forming part of Reissued Letters Patent No. 10,911, dated March 20, 1888.

Original No. 361,988, dated April 26, 1887. Application for reissue filed July 12, 1887. Serial No. 244,119.

*To all whom it may concern:*

Be it known that I, CHARLES W. COLONY, of Sandy Creek, in the county of Oswego, in the State of New York, have invented new and useful Improvements in Lanterns, of which the following, taken in connection with the accompanying drawings, is a full, clear, and exact description.

This invention consists in novel, simple, convenient, and effective devices attached to a lantern for the purpose of confining the globe and cap in their normal positions, and adapted to support said parts in a raised position above the base or lamp when desired to obtain access to said lamp, and also capable of raising the cap from the globe to liberate the latter when desired to remove the same from the lantern, all as hereinafter more fully described, and specifically set forth in the claims.

Figure 1:
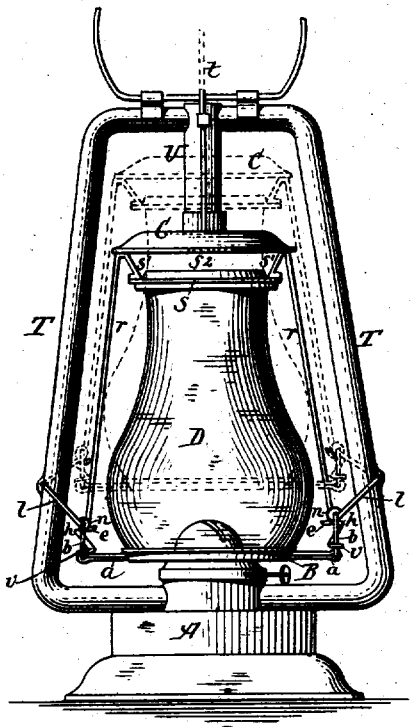
Figure 2:
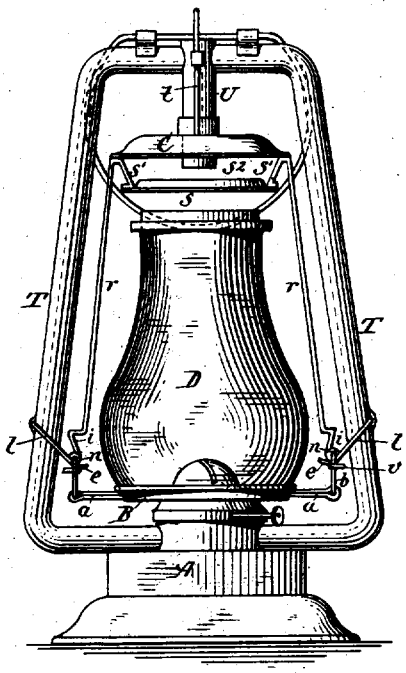
Figure 4:
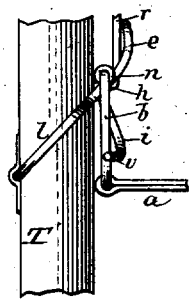
Figure 3:
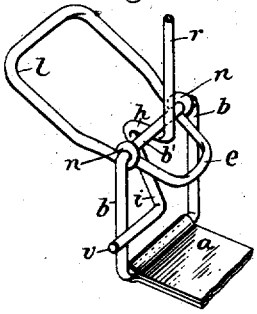
Figure 5:
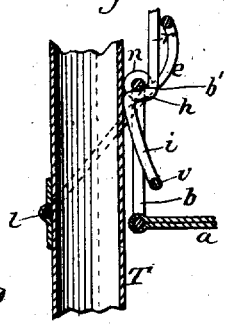

In the accompanying drawings, Figure 1 is a front elevation of a lantern embodying my improvements, shown in its normal condition in full lines and with the globe raised to afford access to the lamp, shown in dotted lines. Fig. 2 is an elevation of said lantern, showing the parts in position for removing the globe from the lantern. Fig. 3 is an enlarged detached perspective view of my invention. Fig. 4 represents a fragmentary side elevation of my invention, showing the globe raised. Fig. 5 is a sectional elevation of the same parts in the same position.

Similar letters of reference indicate corresponding parts.

A represents the lamp, which constitutes the base of the lantern.

B is the usual perforated disk, which is supported on the lamp and in turn supports the globe D.

T T denote the usual air-conducting tubes, which rise from opposite sides of the lamp and are united some distance above the globe, where they are intersected by a vertically-downward-projecting branch tube, U, which terminates a short distance above the globe, and is open at its lower end to receive air, which is conducted to the lamp to supply the flame with oxygen.

C denotes the cap, which is removably seated on top of the globe and slides vertically on the central branch tube, U, in the usual manner.

*s* represents a horizontal ring or globe-holder, which is rigidly secured to the under side of the cap C by bars or arms *s'*, and which rests upon the upper end of the globe, as represented in Fig. 1, when the globe is locked down upon the perforated plate B. An annular space, $s^2$, is formed between the cap C and the ring *s* for the ingress of air and the egress of the products of combustion.

To the top of the cap C is attached a handle, *t*, by which to either raise the cap with the globe and support B to afford access to the lamp, as shown by dotted lines in Fig. 1 of the drawings, or to raise the cap from the globe, as represented in Fig. 2 of the drawings, when desired to liberate and remove the globe from the lantern. The cap C, its holders *s*, spring-rods *r*, and bottom support, B, form the vertically-movable frame in which the globe is mounted.

On each of the tubes T T, which constitute rigid parts of the lantern-frame, I hinge a vertically-oscillatory link, *l*, in such manner as to cause it to embrace the tube, and thus become steadied in its movement. The two guide-links have their oscillatory ends between the tubes T T and globe D and arranged toward each other, and are each formed with a loop, *e*, at the center of the oscillatory end, and with eyes *n n* back of the loop. The disk or globe-support B is connected with the two guide-links *l l* by coupling-links *b b*, which may be either attached direct to the support B, or to intervening arms or projections *a a* on said support, as shown. The links *b b* are coupled to the links *l l* by the end cross-bars, *b'*, of the links *b b* passing through the eyes *n n*, said cross-bars being thus extended across the necks of the loops *e e* and forming elongated eyes of said loops.

To the sides of the cap C, directly above the oscillatory ends of the links *l l*, I rigidly attach pendent spring-rods *r r*, the lower extremities of which pass through the loops *e e* on the links *l l*, and are formed with hooks or offsets *h h*, by which they are adapted to interlock with the cross-bars *b'* of the coupling-links *b*.

Below the offsets *h* the rods *r* are bent slightly toward the globe D, for the purpose hereinafter explained, and the ends of the rods are bent toward the front of the lantern and lie between the coupling-links *b b* and the globe, said forward projecting ends of the rods serving as handles *v* for manipulating the rods, and also as stops for the movement of the rods *r r*, as will be hereinafter presently described.

The operation of my invention is as follows: When the lantern is in its normal condition—*i. e.*, the globe seated upon its support B and the latter upon the lamp, and the cap C with its ring *s* upon the globe, as shown in Fig. 1 of the drawings—the oscillatory ends of the links *l l* are depressed and inclined toward the lamp, and the spring-rods *r r*, being normally inclined outward or toward the tubes T T by the elasticity of said rods, cause the hooks or offsets *h h* of said rods to interlock with the cross-bars *b'* of the coupling-links *b*. The outward pressure of the spring-rods on the inclined links partially locks said links in their positions, so as to cause them to resist to a certain degree an upward strain on their oscillatory ends, and thus hold the cap on the globe and the latter on the support B by the engagement of the spring-rods with the cross-bars *b'* of the links, as before stated. To raise the globe and its support B from the burner, the handle *t* is pushed up, thereby lifting the cap C, and with it the globe-support B, by the rods *r r* interlocked with the links *b b* and *l l*. When the links *l l* have passed above a horizontal position, the outward pressure of the spring-rods *r r* serves to retain the links in their raised position, and thus the globe is supported at an elevation above the lamp, as represented by dotted lines in Fig. 1 of the drawings. When the links are in their aforesaid raised position, the loops *e* of the links bind on the rods *r r* and retain the hooks *h* in their engagement with the cross bars *b'*. The globe is lowered to rest with its support B upon the burner by simply pushing down the handle *t*. To raise the cap C from the globe in order to release the latter, it is necessary to crowd the rods *r r* toward the globe, the loops *e e* of the links *l l* being sufficiently elongated to allow the aforesaid rods to move the requisite distance to withdraw the hooks *h h* from their engagement. This allows the rods *r r* to slide upward in the loops *e e*, the collision of the handles *v v* with the aforesaid loops serving to arrest the aforesaid movement of the rods at the proper time. When in the aforesaid position, the inclined end portions, *i*, of the rods below the hooks thereof press against the cross-bars *b'* of the links *b b*, and by such bearings the rods are enabled to sustain the cap in its raised position. (See Fig. 2.)

The cap is readily replaced on the globe by pushing down the handle *t*, the rods *r r* being sufficiently elastic to yield laterally to the bearings on the coupling-links *b b*, and to slide down in said loops, and by the time the cap is brought to its seat upon the globe the hooks or offsets *h h* are brought under the cross-bars *b'* and allowed to spring outward into engagement with the cross-bars *b'* of the coupling-links *b*, as shown by full lines in Fig. 1 of the drawings. If desired to more securely hold the links in their lowered and raised positions, spring-arms may be used in lieu of the links *b b*, said spring-arms to be attached to the globe-support B, and connected with the links *l l* by pins passing through the spring-arms and through eyes in the links.

Having described my invention, what I claim as new, and desire to secure by Letters Patent, is—

1. The combination, with the top globe-holder and the support upon which the bottom of the globe rests, of rods secured to the top holder, and vertically-sliding connections whereby said rods are attached to the globe-support, substantially as set forth.

2. The combination, with the cap provided with a holder bearing against the top of the globe, and the bottom support of the globe provided with coupling-links, of spring-rods secured to said cap and having their lower ends made vertically movable in the links of the bottom support, substantially as set forth.

3. The combination, with the top globe-holder and the support upon which the bottom of the globe rests, and which is provided with coupling-links, of rods attached to said top holder and provided with offsets and stops which engage with said links and form therewith a vertically-sliding connection, substantially as set forth.

4. The combination, with the tubular lantern-frame, of a vertically-movable top globe-holder and a bottom globe-support, spring-rods attached to the top holder, guide-links pivoted to the tubes, and coupling-links attached to the bottom support and connected with the spring-rods, whereby the spring-rods are deflected or strained as the globe-frame is raised or lowered, substantially as set forth.

5. In combination with the lantern-frame, globe-support, and movable cap, guide-links pivoted on said frame, coupling-links connecting the globe-support with the guide-links, and spring-rods secured to the cap and having their extremities sliding in the aforesaid coupling-links and provided with coupling-hooks adapted to interlock with the links for locking the globe between its support and the cap, and having also bearings adapted to engage the links and sustain the cap raised from the globe, substantially as set forth.

6. In combination with the lantern-frame, globe-support, and movable cap, guide-links hinged on said frame at opposite sides of the globe and arranged with their oscillatory ends toward each other, and pendent spring-rods attached to the cap at the sides directly over the guide-links and normally inclined outward, and suitable connections between the lower extremities of said rods and said links, whereby the links are confined in both their depressed and raised positions, substantially as set forth.

7. In combination with the base A, globe-support B, tubes T T, and movable cap C, the links *l l*, hinged on the tubes and formed with loops *e*, the couplings *a b*, connecting the support B with the links *l*, and the spring-rods *r r*, attached to the cap C and having their lower extremities extending through the loops *e e*, and formed with the hooks *h* and bearings *i*, substantially as described and shown.

8. In combination with the base A, globe-support B, tubes T T, and movable cap C, the links *l*, hinged to swing vertically on the said tubes and formed with the loops *e*, the coupling-links *b*, connected with the links *l*, and having a bar, *b'*, extending across the neck of the aforesaid loop, and the spring-rods *r*, attached to the cap and having their lower extremities extending through the loops *e*, and formed with the hooks *h* and bearings *i*, substantially as described and shown.

9. In combination with the base A, globe-support B, tubes T T, and movable cap C, the guide-links *l l*, hinged on said tubes to swing vertically thereon and embracing the same, and formed with loops *e*, and eyes *n n* back of said loops, the coupling-links *b*, connected at one end with the globe-support and having the opposite end extending through the eyes *n n*, and the spring-rods *r r*, attached to the cap and having their lower extremities normally inclined outward and extending through the loops *e e*, and formed with the offsets or hooks *h h* and bearings *i i*, said loops being of a size to allow the spring-rods *r r* to be moved laterally to throw the hooks thereof out of engagement with the coupling-links when in a depressed position, and to hold said hooks in their engagement with said links when in an elevated position, substantially as set forth and shown.

CHARLES W. COLONY.

Witnesses:
M. A. PUYER,
J. LYMAN BULKLEY.